United States Patent [19]
Morrone

[11] Patent Number: 5,135,106
[45] Date of Patent: Aug. 4, 1992

[54] MEDIA STORAGE APPARATUS

[76] Inventor: James V. Morrone, P.O. Box 26, Essex Station, Boston, Mass. 02112

[21] Appl. No.: 206,033

[22] Filed: Jun. 13, 1988

Related U.S. Application Data

[63] Continuation-in-part of Ser. No. 756,716, Jul. 18, 1985, Pat. No. 4,714,157, which is a continuation-in-part of Ser. No. 785,154, Oct. 7, 1985, Pat. No. 4,750,611, which is a continuation-in-part of Ser. No. 131,358, Dec. 10, 1987, abandoned.

[51] Int. Cl.$^5$ .............................................. B65D 85/57
[52] U.S. Cl. ....................................... 206/310; 206/309
[58] Field of Search ............... 206/232, 307, 309, 310, 206/311–313, 387, 444, 472, 459, 315.1

[56] References Cited
U.S. PATENT DOCUMENTS

| | | | |
|---|---|---|---|
| 3,452,918 | 7/1969 | Froehlig | 206/309 |
| 3,951,264 | 4/1976 | Heidecker et al. | 206/309 |
| 4,385,693 | 5/1983 | Gelardi et al. | 206/459 |
| 4,535,888 | 8/1985 | Nusselder | 206/444 |
| 4,588,086 | 5/1986 | Coe | 206/309 |
| 4,613,040 | 9/1986 | Morris, II et al. | 206/315.1 |
| 4,702,369 | 10/1987 | Philosophe | 206/309 |
| 4,714,157 | 12/1987 | Morrone | 206/309 |
| 4,736,840 | 4/1988 | Deiglmeier | 206/309 |
| 4,793,480 | 12/1988 | Gelardi et al. | 206/312 |

Primary Examiner—Jimmy G. Foster
Attorney, Agent, or Firm—Herbert L. Gatewood

[57] ABSTRACT

A storage case for disc-type media including a clip for retaining the case in a partially open position. Support means for the disc in the case is in the form of integral support members integrally disposed from the base of the case. Also shown is a holder for a pick-up device for the disc.

40 Claims, 11 Drawing Sheets

MEDIA STORAGE APPARATUS

RELATED APPLICATIONS

This application is a continuation-in-part of the following earlier filed and copending applications on related subject matter: Ser. No. 06/756,716, filed Jul. 18, 1985 and now granted as U.S. Pat. No. 4,714,157, Ser. No. 06/785,154, filed Oct. 7, 1985 and now granted as U.S. Pat. No. 4,750,611, and Ser. No. 07/131,358, filed Dec. 10, 1987, now abandoned, all entitled MEDIA STORAGE APPARATUS.

BACKGROUND OF THE INVENTION

The present invention relates in general to a storage apparatus for media. More particularly, the invention relates to improvements in storage cases or the like for the storage of discs including, but not limited to, compact audio discs that are now coming into extensive use.

In my prior related above-identified applications, there are described a number of different embodiments of storage cases or containers for these discs. It is the purpose of the present invention to now set forth additional embodiments that present further improvements in the state of the art.

Accordingly, it is an object of the present invention to provide an improved storage case or a container for media and in particular for compact discs.

Another object of the present invention is to provide an improved means associated with storage cases for facilitating opening thereof.

A further object of the present invention is to provide means for retaining a disc pick-up device so that it is in readiness for use.

SUMMARY OF THE INVENTION

To accomplish the foregoing and other objects, features and advantages of the invention, there is provided an improved form of storage case having disposed therein, in one embodiment, an integral support member for the disc. In accordance with another feature of the present invention there is provided an improved clip for use with the storage case and which enables the storage case to be lifted to a partially opened position. In accordance with another feature of the present invention there is provided a stick-on thumblift that is readily attached to the cover of the storage case and which enables one to easily lift the cover. In a related embodiment there is preferably a stick-on lift on both the cover and base to further facilitate opening. In accordance with still a further feature of the present invention there is provided a storage device for a disc pick-up device. This storage device is in the form of a storage compartment having a back wall that permits ready access to the pick-up device.

Further features of the present invention include a protector pad for the identification program sheet associated with the disc storage device, and adapted to prevent wearing through of the program sheet by contact with the disk pick-up device Another feature of the invention is an improved pick-up device of forked construction, having ears disposed along the length thereof to assist in positioning of the disc. A related feature is the provision of one or more notches at the lower end of the legs of the pick-up device to assist in engagement with the center hole of the disc. In alternate embodiments described herein, the disc may be supported either at its periphery on support ribs, or at its center by means of a support hub. Another feature of the present invention is the provision of a stick-on thumblift that is readily attachable to the cover of the storage case, and which enables one to easily lift the cover. This stick-on thumblift also has provision for receiving indicia such as a number to identify the disc, particularly for storage purposes. Another feature of the present invention is an improved clip for use with the storage case, and which provides multiple functions. The improved clip enables the lid of the storage case to be held in a partially opened position. The clip also provides a seal in the closed position of the storage case, so that dust and dirt cannot enter the storage case. Lastly, the improved clip includes means for engaging the disc to retain the disc in firmly supported position on the disc support insert within the case. In this regard, the cover of the case preferably also includes an engaging member for engaging an opposite side of the disc for full and firm support thereof in the storage case. The particular member for engaging the other side of the disc is preferably also used in the storage case for support of the identification tag associated with the storage case.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
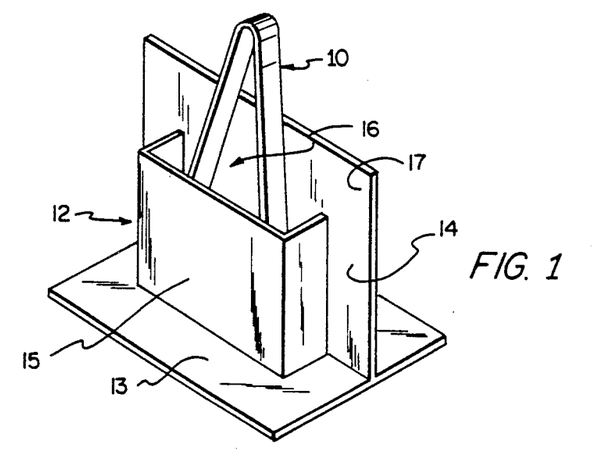
FIG. 1 is a perspective view of the storage device for the disc pick up device.

Reference is now made to the perspective view of FIG. 1, which illustrates a pick-up device. This pick-up device may be of the type illustrated in my earlier co-pending application, such as is illustrated in FIGS. 15-21 of that application. The pick-up device 10 is contained within a storage member 12 which comprises a flat base 13, a rear wall 14, and a three-sided wall 15 which, with the wall 14, provides a storage compartment 16. The rear wall 14 forms a back stop and guide so that the pick up device 10 may be easily inserted into the holder. It is noted that the top edge 17 of the wall 14 has a height so as to permit the device 10 to extend thereabove. This lowered wall 14 enables the pick-up device 10 to be free from obstruction to enable the user to lift the pick-up device out without any problem. The base wall 13 holds the holder in an upright position as illustrated.

The pick-up device 10, because it extends above the top edge 17 of wall 14, is readily available to be selected when desired. When the pick-up device is to be inserted back into the holder, it may simply be inserted into the compartment 16 against the rear wall 14 and held in the general position illustrated in FIG. 1.

Figures 2A, 2B:
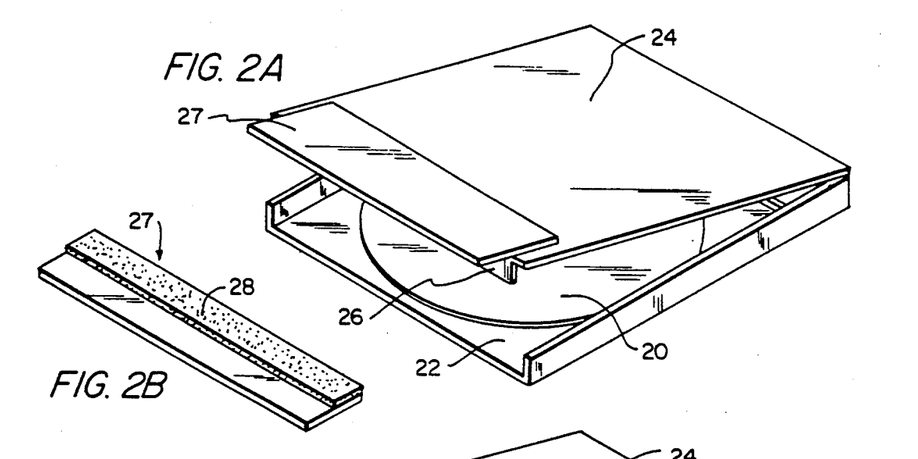
FIGS. 2A-2C illustrate stick-on thumblift means associated with the disc storage case, illustrating the lift device associated with the cover in one embodiment and in another embodiment associated with both the cover and base.

FIG. 2A illustrates a disc storage compartment for the disc 20. In FIG. 2A this is shown as comprising a base 22 and a cover or lid 24. The lid 24 has a downwardly depending front wall 26 that normally closes with the base. FIG. 2B illustrates the thumblift 27 with the double sticky piece 28. From the position illustrated in FIG. 2B, the thumblift 27 is inverted and placed on the top front edge of the lid 24 extending frontwardly therefrom, as illustrated in FIG. 2A. This enables one, once the thumblift 27 is inserted in place as in FIG. 2A, to easily lift the lid 24.

Figure 2C:
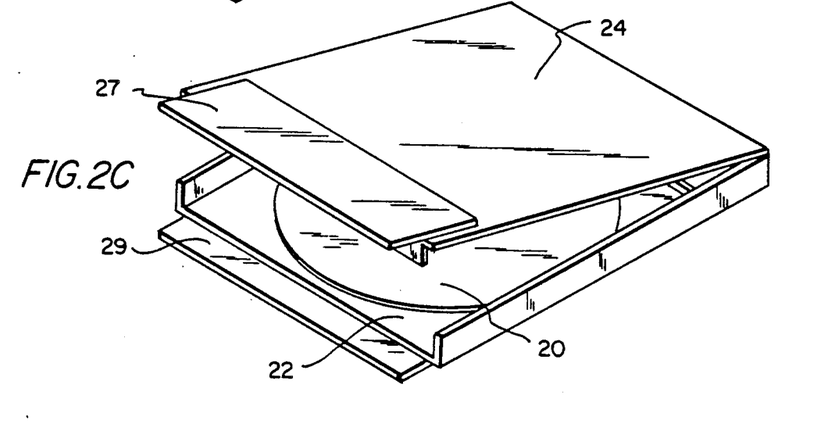

FIG. 2C illustrates an alternate embodiment in which there is also shown the thumblift 27 secured to the lid 24. However, there is also shown a substantially identical thumblift 29 secured to the underside of the base 22 of the disc case. The thumblift 29 also, of course, has a sticky back and thus is substantially identical to the member illustrated in FIG. 2B. In the embodiment of FIG. 2C there are thus two pairs of thumblifts, one on the lid and one on the base. This is desirable in instances where additional assistance may be needed to open the storage case.

Reference is now made to FIGS. 3A-3D. This embodiment of the invention illustrates a storage case which is comprised of a base 30 and cover or lid 32. It is noted that the base 30 has extending from the bottom thereof a small upright wall 33. In front of the wall 33, the base 30, of course, has a bottom flat surface upon which the disc or insert may rest. Behind the wall 33 at the bottom of the case there is an open space at 34.

Figure 3A:
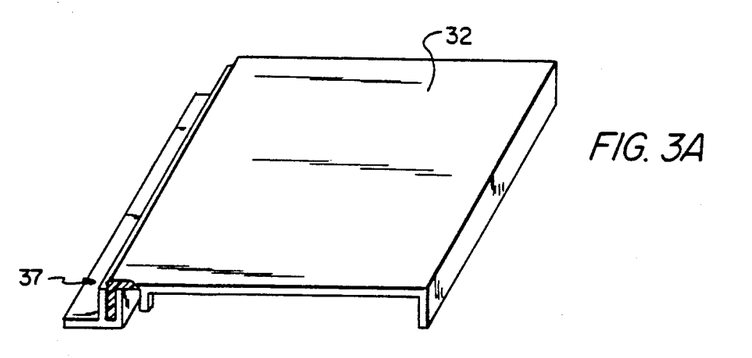
FIGS. 3A-3D illustrate another embodiment of the storage case employing a plastic clip that enables the storage case to be open to a partially open tilted back position.
Figures 3B, 3C, 3D:
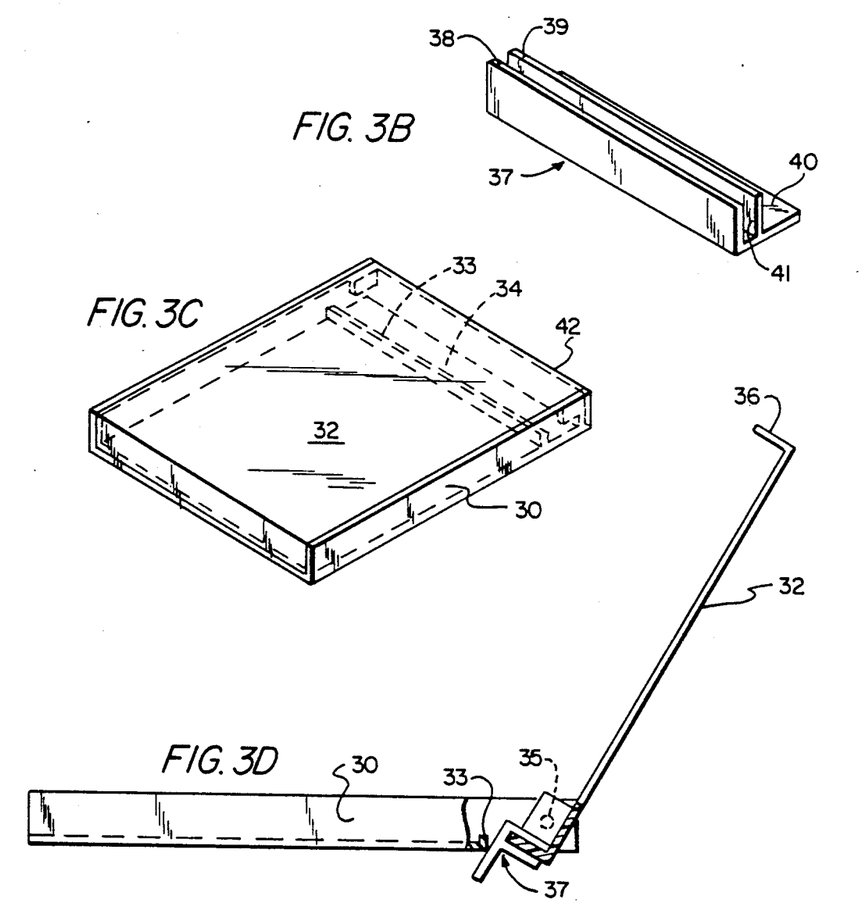

It is also understood in the embodiment of FIGS. 3A-3D that there is some type of a hinging means not specifically illustrated but identified schematically by the hinge point 35 in FIG. 3D. It is also noted from FIG. 3D that the cover 32 has a front covering member 36.

Now, with regard to the embodiment of FIGS. 3A-3D, there is provided a plastic clip 37 that is comprised of upright walls 38 and 39 and a rearwardly directed wall 40. The wall 40 is rearwardly directed such as in the position of FIG. 3A. The walls 38 and 39 form a channel 41 and, as illustrated in FIG. 3A, this channel is adapted to receive the rear wall 42 of the lid 32.

In the normal closed position of the storage case, the wall 40 is directed rearwardly. However, when the case is opened, the clip 37 permits the lid 32 to move to a partially opened position, as clearly illustrated in FIG. 3D. The wall 40 contacts the upright wall 33 and limits the open position of the lid to that illustrated in FIG. 3D. As indicated previously, the rear of the base of the case is open at 34 and this permits the clip 37 to clear the sides of the base and only contact something when it comes into contact with the upright wall 33.

Figure 4A:
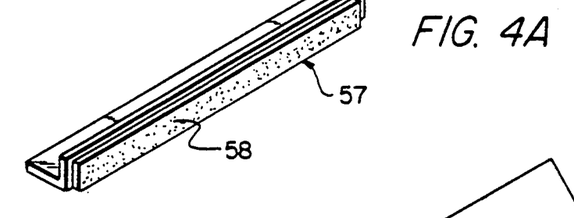
FIGS. 4A-4E illustrate a further embodiment of the present invention in the form of an angle member at the rear of the case which also permits the case to be maintained in a partially opened position.
Figure 4B:
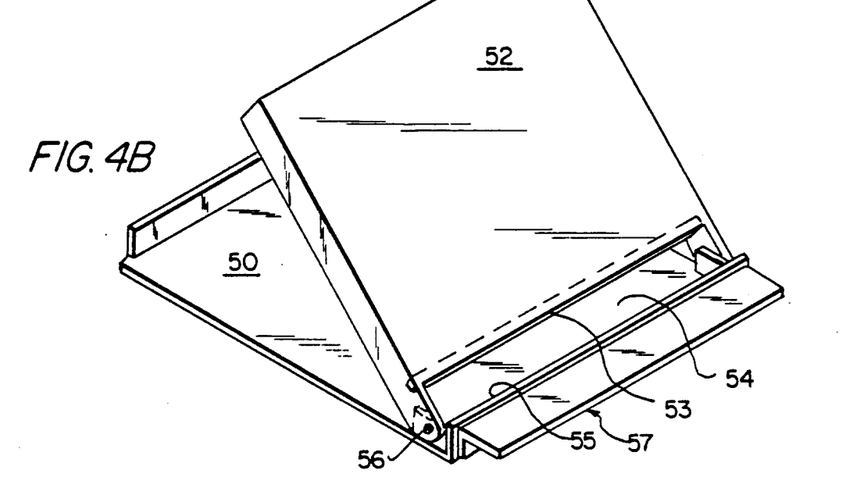

FIGS. 4A-4E illustrate further features of the present invention. In particular, FIG. 4B illustrates a storage compartment in which the cover and base have essentially been reversed in comparison to the case illustrated in FIG. 3C As far as the orientation is concerned in FIG. 4B, the case comprises a base 50 and a cover 52. The cover 52 has an inwardly directed wall 53 and is open at 54. The rear wall 55 of the base supports hinging means to enable the cover to be pivotally connected to the base. This hinging means is illustrated at 56.

In accordance with the invention as illustrated in FIG. 4A there is provided a plastic angle member 57 that has secured to one leg thereof a sticky back material 58 which may be a sticky back tape having adhesive on both sides. FIG. 4A illustrates the plastic angle with the sticky back applied. FIG. 4B illustrates the plastic angle member 57 secured to the rear wall 55 of the base.

Now, in the closed position of the case, the plastic angle member 57 does not interfere at all with the operation of the case. The case may be opened to a rearwardly tilted position in which case the wall 53 contacts the top surface 58 of the angle member 57. In FIG. 4B the lid is shown in a partially opened position. However, if the lid is moved rearwardly, then the lid is permitted to rotate past a 90° opened position to a position in which the wall 53 finally contacts the surface 58 of the angle member 57.

Figure 4C:
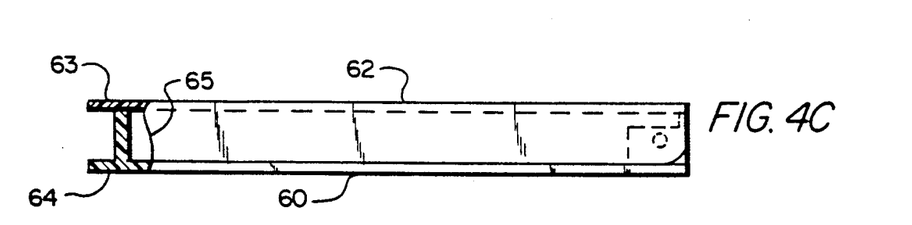

FIG. 4C shows another feature of the present invention in which there is provided a base 60 and a cover or lid 62. It is noted that the base 60 has a front wall 65 and there is a thumblift associated with both the cover and base. As illustrated in FIG. 4C, there is an integral extension 63 of the cover that forms a thumblift. Similarly, there is an extension 64 of the base 60 that also forms a thumblift. Both of these are integrally molded into the disc case.

Figure 4D:
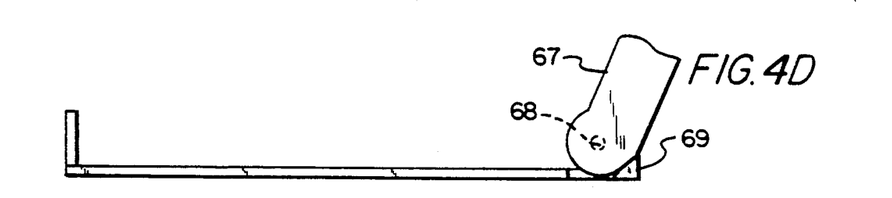
Figure 4E:
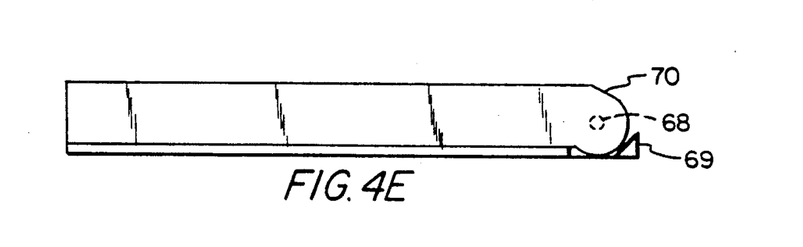

FIGS. 4D and 4E illustrate a further embodiment of the present invention. In FIGS. 4E and 4D there is shown a fragment of the base 66 and cover 67. There is a pivot hinge at 68 between the cover and base. The base is provided with an integral lid stop 69. This is molded directly into the base of the case. This keeps the cover from falling all the way back. FIG. 4D illustrates the cover 67 and its rearward tilted position with the cover preferably being provided with a flat 70 that is adapted to engage the stop 69 as illustrated in FIG. 4D. FIG. 4E illustrates the case in its closed position in which the flat 70 is out of engagement, of course, with the stop 69.

Figure 5A:
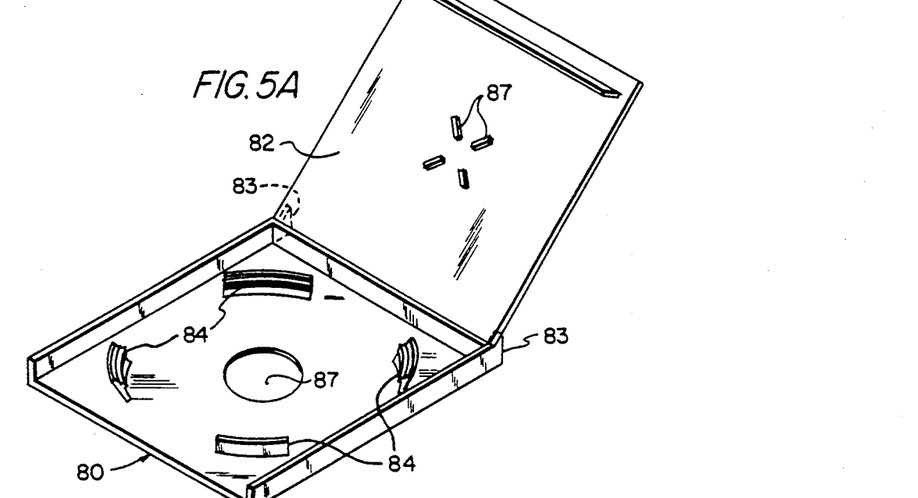
FIGS. 5A-5E illustrate a further embodiment of the invention in the form of an integral support member for the disc within the storage case along with associated retaining means preferably integral with the case cover or width.

Reference is now made to FIGS. 5A–5E, which illustrate further features of the present invention. FIG. 5A illustrates a storage case with integral disc support. In my prior application there is provided a separate insert. However, in accordance with the features described herein, the support for the disc is now integral with the storage case base.

Thus, there is illustrated a storage case base 80 and associated lid 82. In the embodiment of FIG. 5A there is also provided a back stop 83 so that the lid remains in a backward angular position. Extending upwardly from the floor of the base 80 are four upright support members 84. Each of these support members is tilted, as illustrated in FIGS. 5C and 5D. FIGS. 5C and 5D are substantially identical, with the exception that the embodiment of FIG. 5C also includes the ledge 85 for supporting the disc 86. As indicated herein, these uprights or support members 84 are disposed at an angle and are molded directly into the base of the plastic disc case. There is also, as illustrated, the preferred hole 87 in the base These support members hold the disc in an elevated position such as illustrated in either FIG. 5C or FIG. 5D.

Figure 5B:
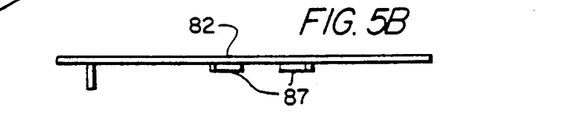
Figure 5C:
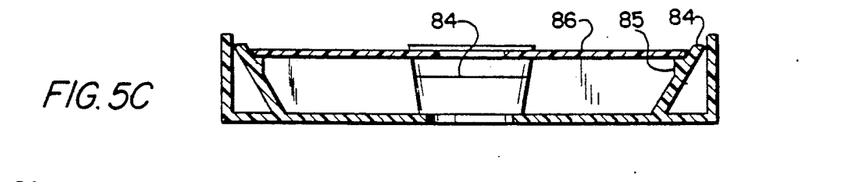
Figure 5D:
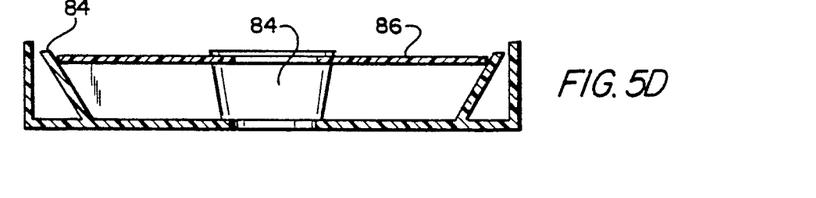

Now, with regard to FIG. 5B, it is noted that the lid 82 has plastic ridges 87, as also illustrated in FIG. 5A. These extend downwardly and contact the center of the disc to hold the disc in place when the cover is closed. This prevents the disc from moving when the container is in its closed position The ridges 87 contact only the center of the disc and thus do not do any damage to the media part of the disc.

Figure 5E:
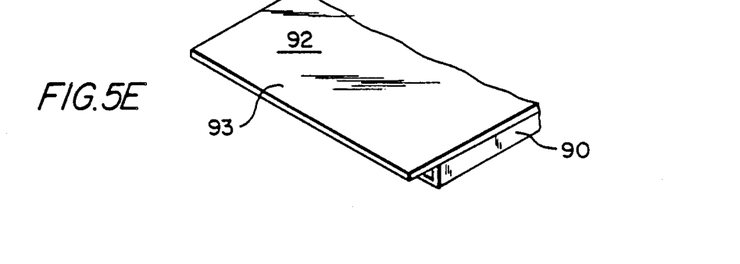

Finally, FIG. 5E shows a case base 90 and a lid 92 with the lid 92 having an extension 93 that forms a thumblift that is directly molded into the lid of the case. This permits the lid to be lifted with ease.

Figures 6, 7:
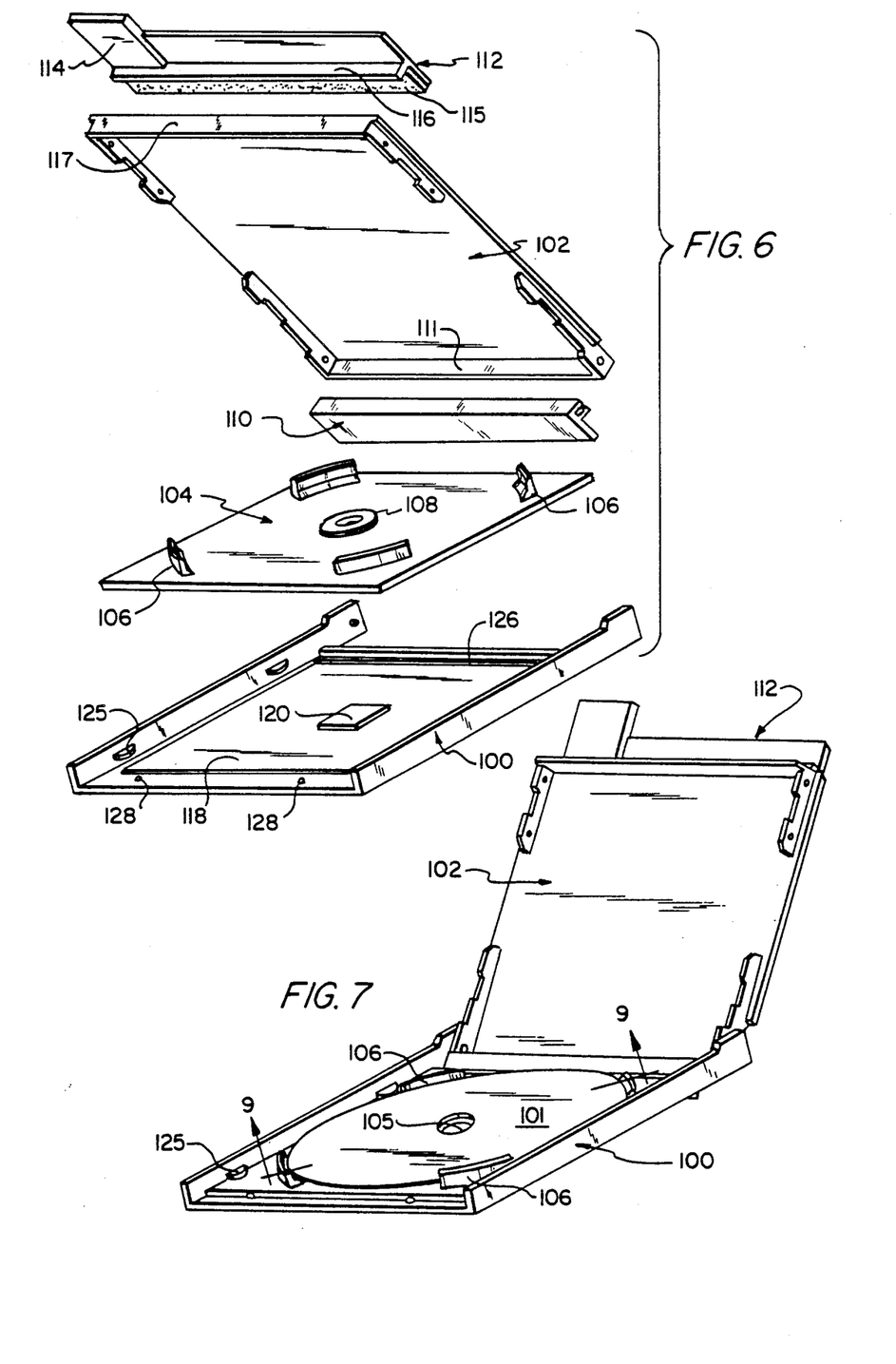
FIG. 6 is an exploded perspective view of a further embodiment of the present invention.
FIG. 7 is a perspective view of the embodiment of FIG. 6 showing the case with its cover in open position.

Reference is now made to the embodiment of the invention illustrated in FIGS. 6–10. The disc storage case is illustrated herein as including a base 100 and a cover or lid 102. The cover or lid 102 is adapted to pivot relative to the base 100. FIG. 6 shows the parts in an exploded perspective view. FIG. 7 shows the cover 102 engaged with the base 100, with the cover 102 in its tilted back open position enabling ready access to the disc 101.

FIG. 6 also shows the insert 104, which is the support member for the disc 101. The disc 101 is illustrated in FIG. 7 but is not illustrated in FIG. 6. The insert 104 is provided with four spacedly and peripherally disposed ribs 106. The insert 104 also includes a center hub 108.

Figure 8:
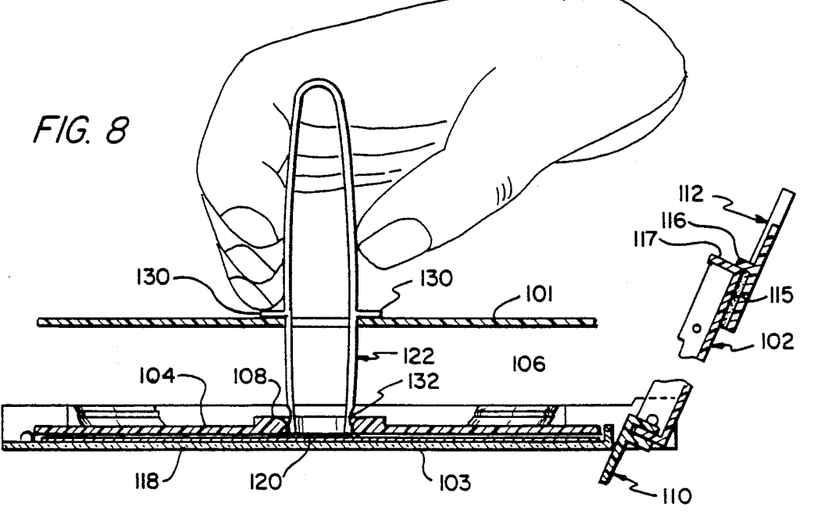
FIG. 8 is a cross-sectional view taken through the embodiment of FIGS. 6 and 7 and illustrating the disc in an initial position for transfer into the case.

FIG. 6 also illustrates a clip 110 that is adapted to engage with the rear wall 111 of the cover 102. The clip 110 enables the storage case to be held in a partially open position by means of a wall thereof engaging an edge defining the bottom of the base 100. In this regard, refer to FIG. 8, showing the engagement of the clip 110 with the base bottom wall 103.

Figure 19:
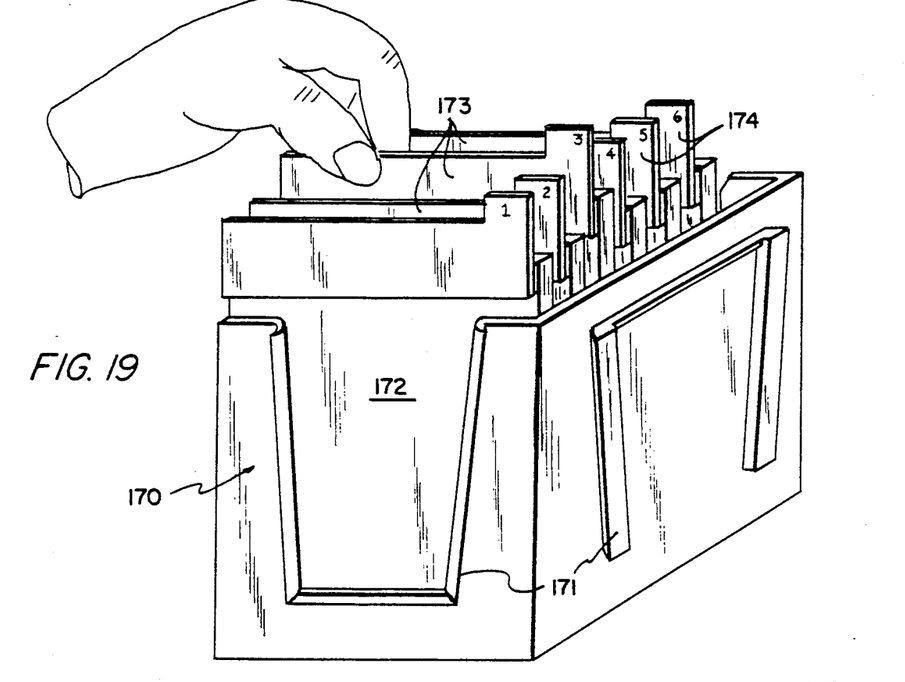
FIG. 19 is a perspective view showing a series of storage cases in an overall storage member.

Also illustrated in this embodiment is the thumblift 112, which has an enlarged and thicker tab 114 for the purpose of providing indicia such as the numbering illustrated in FIG. 19. In this regard, also refer to the indicia or numbering illustrated in FIGS. 15 and 16, to be described in further detail hereinafter. The thumblift 112 includes a sticky-back adhesive strip 115, along with an elongated rib 116. The rib 116 is adapted to be positioned against the front wall 117 of the cover 102, to assist in positioning of the thumblift on the cover. Also refer to the cross sectional view of FIG. 8, which shows the rib 116 in relation to the wall 117. FIG. 8 also illustrates the adhesive strip 115.

FIG. 6 also illustrates, within the base 100, the identification program sheet 118 associated with the storage case. The program sheet 118 has on its side, and viewable from the exterior of the case, information about the content of the compact audio disc. One of the important features of the present invention is a protector pad 120, which is adapted to be positioned under the hole 105 in the disc 101. The pad 120 prevents the pick-up device 122 from scratching and eventually wearing through the sheet 118. In this regard, in FIGS. 8 and 9, note the position of the pad 120 relative to the hole in the disc as well as the hole in the insert hub 108. Also note, in FIGS. 8 and 9, the manner in which the pick-up device 122 is moveable across the pad for engagement with and disengagement from the disc 101. This constant movement would cause wearing of the identification sheet. However, the protector pad 120 prevents this.

FIG. 7 shows the insert 104 in place within the base of the storage case. In this regard, the storage case is provided with guide tabs 125 for guiding the insert into place. It is noted that the tabs are spaced from the bottom wall so that the insert can fit. The base is also provided with a rear lip 126 for retaining one end of the insert. At the front side, there are provided relatively small retaining bumps 128. In this regard, refer to FIG. 7.

Figure 9:
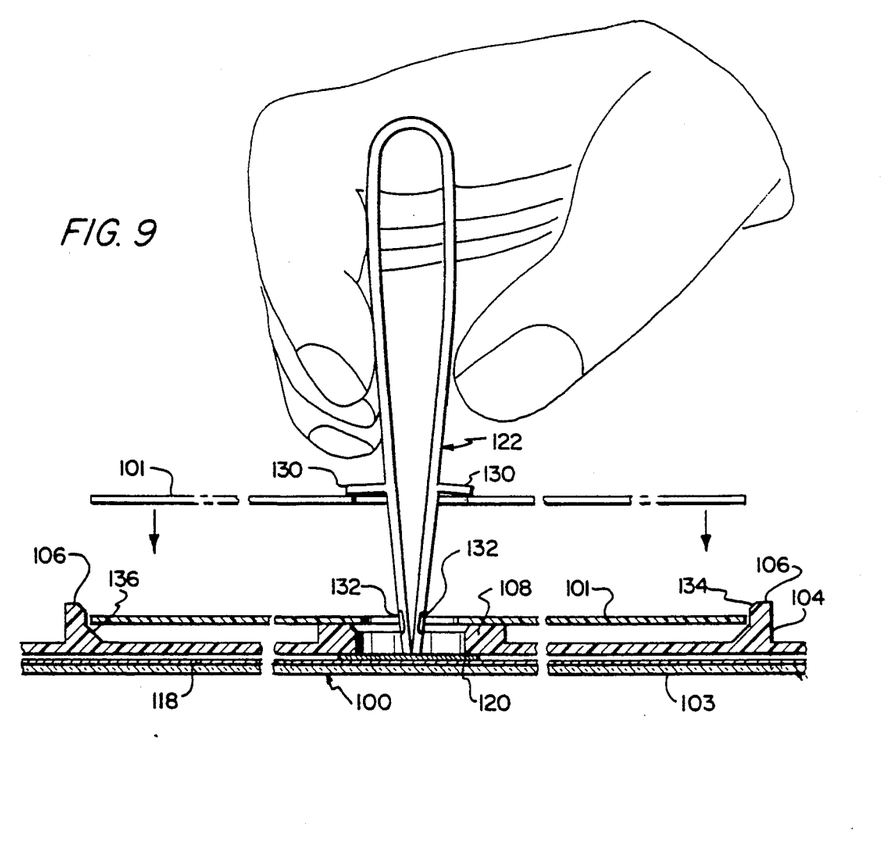
FIG. 9 is a cross-sectional view such as taken along line 9—9 of FIG. 7 and illustrating the pick-up device having been deflected to enable the disc to be dropped onto the insert.
Figure 10:
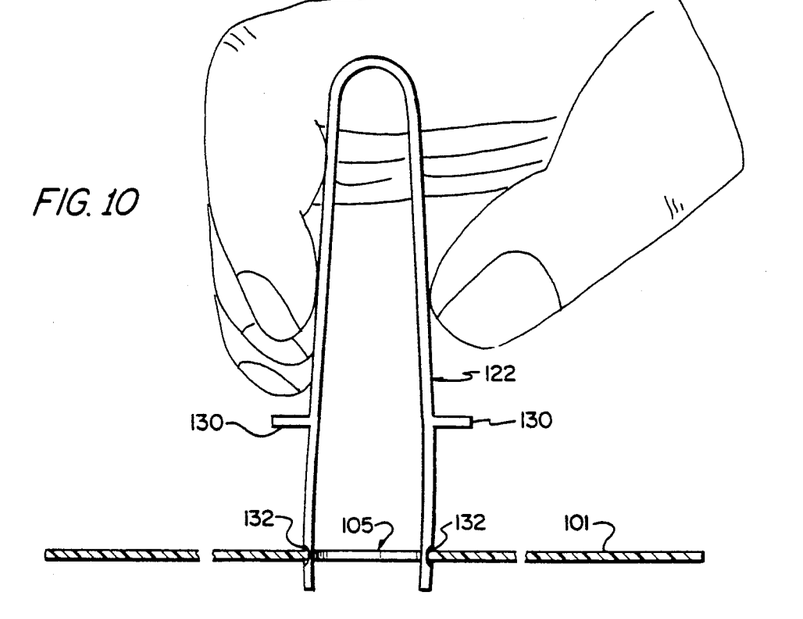
FIG. 10 is a view illustrating the manner in which the pick up device has its notches engaged with the disc for picking it up.
Figures 15, 16, 17, 18:
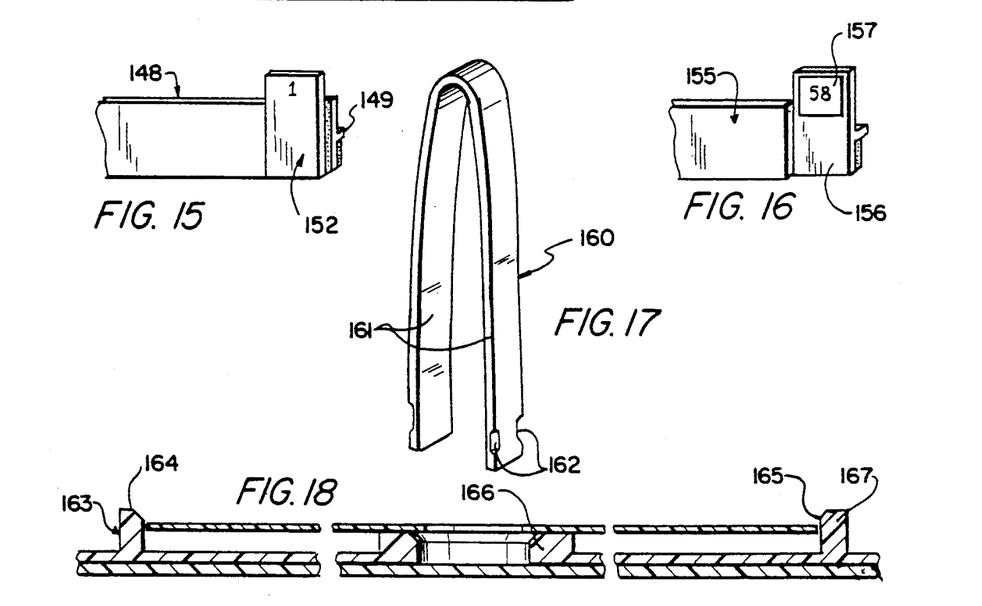
FIG. 15 is a front perspective view of the thumblift of FIG. 14.
FIG. 16 is still another embodiment of the thumblift.
FIG. 17 shows an alternate embodiment of the pick-up device without ears.
FIG. 18 is a cross-sectional view of another embodiment of the insert in which the media disc rests only on the hub of the insert.

FIGS. 8–10 show the pick up device 122. The pick-up device 122 is of forked construction. Also refer to the perspective view of FIG. 17, showing the pick up device without ears. FIGS. 8 10 show the pick-up device having a pair of oppositely disposed and directed ears 130. These ears 130 prevent the disc from going any higher on the fork. The ears 130 are engaged primarily when the disc is removed from the disc player. In this regard, FIG. 8 shows the disc being supported in a position in which it has just been removed from the player, and is now to be inserted into the storage case.

The pick-up device 122 is also provided with oppositely disposed and directed notches 132. In the position of FIG. 9, the pick-up device has been compressed so that it releases from the disc and the disc is permitted to drop onto the insert, for example to the position shown in cross-section in FIG. 9. In this regard, it is noted that the ribs 106 have a top bevel at 134, noted in FIG. 9, that is used to guide the disc down. The ribs 106 also have a lower disposed bevel at 136 to keep the disc from touching the bottom wall of the insert. Between the bevels 134 and 136 there is a vertical segment that keeps the disc from shifting from side to side. This is most clearly illustrated in FIG. 9.

FIG. 10 illustrates the pick-up device with its notches 132 engaging the hole 105 in the center of the compact disc 101. The notches 132 are useful in providing firm contact between the pick up device and the disc. It is furthermore noted that the pick up device is constructed to normally be spread a distance greater than the hole in the compact disc and thus has to be compressed to arrive at the position illustrated in FIG. 10 herein.

In the embodiment illustrated in FIG. 9, it is noted that the disc 101 rests upon the hub 108. In this embodiment, the primary support for the disc is at the hub, and in this way there is little interference at the periphery of the disc.

Figures 11, 12, 13, 14:
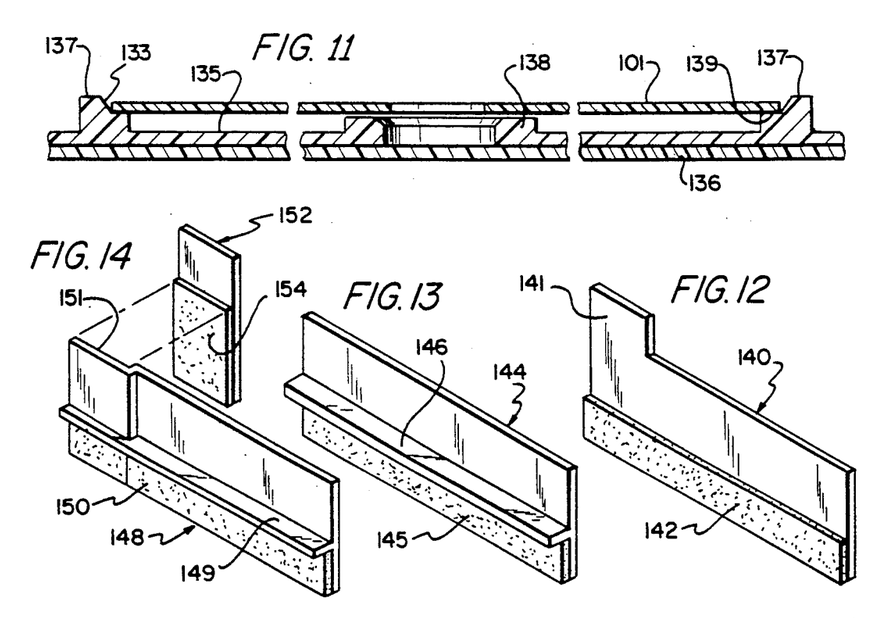
FIG. 11 is a cross-sectional view of an alternate insert construction.
FIG. 12 is a perspective view of one embodiment of the thumblift of the present invention.
FIG. 13 is a perspective view of another embodiment of the thumblift of the present invention.
FIG. 14 is a perspective view of still another embodiment of the thumblift of the present invention.

Reference is now made to FIG. 11 for a fragmentary view of an alternate embodiment of the invention. FIG. 11 shows primarily an alternate construction of the insert. In FIG. 11, there is disclosed an insert 135 having a base wall 136 and a plurality of spacedly and peripherally disposed support ribs 137. There is also a centrally disposed hub 138. In this particular embodiment, it is noted that the disc 101 is supported not at its center area, but at its periphery. This support is provided by means of a ledge 139. This embodiment also includes a bevelled wall 133 that is used to get the disc onto the seat provided by the ledge 139. In FIG. 11, it is noted that, as indicated previously, there is a space between the hub 138 and the disc 101. The primary support for the disc is thus at its periphery at the ledge 139 in this particular embodiment.

Reference is now made to FIGS. 12-16 for a number of different embodiments of the thumblift device. A first embodiment of the invention is illustrated in FIG. 12. The thumblift 140 includes a number tab 141 at one end thereof. The number is provided on the reverse side to that illustrated in FIG. 12. Also used on the thumblift 140 is the double-sided tape strip 142.

FIG. 13 shows an alternate embodiment of the thumblift. In this embodiment, the thumblift 144 may have indicia thereon, but there is not illustrated any separate enlarged tab. FIG. 13 does, however, illustrate the elongated adhesive strip 145 and furthermore illustrates the rib 146 similar to the rib 116 previously discussed in the embodiment of FIG. 6. The rib is used for positioning of the thumblift relative to the storage case cover.

In FIG. 14 there is shown the thumblift 148. On the thumblift 148 is the elongated rib 149 and the adhesive strip 150. The thumblift 148 is provided with a recess at 151 for accommodating a separate number piece 152. On the number piece 152 is a double-sided adhesive tape 154. This arrangement enables one to attach the thumblift to the case and separately attach the number piece to the thumblift.

FIG. 15 is a perspective view of basically the same thumblift as illustrated in FIG. 14. FIG. 15 shows the number piece 152 with numbering thereon. FIG. 15 also shows the two pieces of double sided tape, one for enabling securing of the thumblift to the case, and the other for enabling securing of the number piece to the thumblift.

FIG. 16 shows still a further embodiment of the present invention, including a thumblift 155 having a recess therein with an integral number wall 156. In FIG. 16, note the numbering at 157. This embodiment also includes the positioning rib and the rear double-sided tape for attachment of the thumblift to the storage case, and in particular the cover thereof.

FIG. 17 shows an alternate embodiment of the pick-up device. In FIG. 17, the pick-up device 160 has no ears, as it does in the previous embodiment. The device 160 includes a pair of legs 161, each having an associated pair of lining notches 162. Again, these notches are for engagement of the pick-up device with the hole in the center of the disc.

FIG. 18 shows an alternate embodiment of the invention. In this embodiment of the invention, the insert 163 has support ribs 164, with bevelled tops 165. The insert also includes a central hub 166, having an opening therein to enable access to the compact disc by means of the pick-up device. In this embodiment of the invention, the bevels 165 assist in guiding the disc into a supporting position on the insert. For this particular embodiment, the disc is supported at the hub 166. The wall 167 of the support rib prevents side-to-side movement of the disc.

Reference is now made to FIG. 19 for an illustration of a storage box 170. The storage box 170 preferably includes interlocking ribs 171 that would enable the storage box to be stacked with other storage boxes. FIG. 19 shows the storage box containing a series of media storage cases 172. Each of these cases has a thumblift device 173, as illustrated. The thumblift device may be one of a number of different types described herein. Each of the thumblift devices preferably has the numbering tab as illustrated at 174. The thumblift devices are useful in not only assisting in opening of the case when the disc is to be accessed, but also are helpful in enabling one to pull the disc out of the storage box 170. FIG. 19 shows the illustration of numbering on each of the storage cases for easy access and identification.

Figure 20:
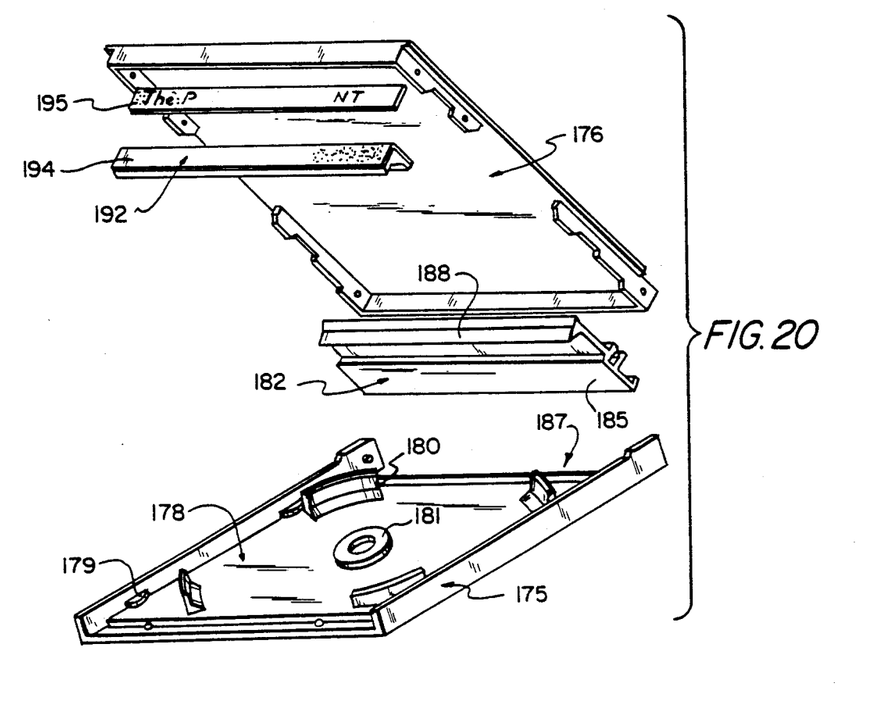
FIG. 20 is an exploded perspective view of another embodiment of the present invention.
Figure 21:
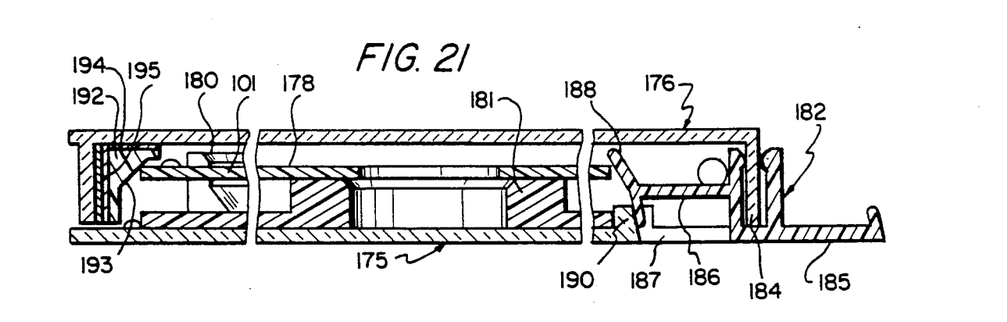
FIG. 21 is a cross-sectional view of the embodiment illustrated in FIG. 20.

Reference is now made to FIGS. 20 and 21 for a further embodiment of the present invention. In this embodiment, the storage case is comprised of a base 175 and a cover 176. Within the base 175 there is shown a separate insert 178. The insert is slid into the base and retained in a manner previously described in association with FIG. 6. In this regard, note the guide ribs 179 on the side walls of the base. The insert 178 includes spacedly disposed ribs 180 and a centrally disposed hub 181. Attached to the cover 176 is an improved form of clip 182. The clip 182 is shown in a cross sectional view in FIG. 21.

In the embodiment of FIGS. 20 and 21, the disc 101 is supported on the hub 181. The clip 182 is a multi-function clip and is provided with a recess for interlocking with the rear wall 184 of the cover 176. This is clearly illustrated in FIG. 21. The clip also includes projections extending in either direction, including a leg 185 and a leg 186. In the closed position of the case, as illustrated in FIG. 21, it is noted that the leg 186 forms a seal, essentially closing the opening 187 provided at the rear of the base of the storage case. Again, refer to FIG. 21. Moreover, the leg 186 has an extension 188, as also noted in FIG. 21, that is adapted to engage the peripheral edge of the disc 101 in the closed position of the case. The leg 185 of the clip 182 is used in the open position of the case, and bears against the bottom wall 190 of the base 175. This is similar to the arrangement illustrated in FIG. 8 by the downwardly depending leg together with the clip 110.

In summary, the clip illustrated in this embodiment of the invention provides multiple functions, including a means for enabling the case to be held in a partially open position, an enclosing seal for the case, and a means for retaining and securing directly the edge of the disc at one side thereof. All of these features are illustrated most completely in FIG. 21.

At the front of the case, as also illustrated in FIGS. 20 and 21, there is provided a retainer 192, which has an interior bevelled wall 193. The wall 193 engages the opposite side of the disc as it relates to the extension 188 of the clip 182. The retainer 192 is secured in the case by means of a double-sided tape 194 that extends over the two surfaces thereof. The retainer 192 is held at the front corner of the cover of the case by means of the tape. The tape also holds the identification strip 195 in place, as illustrated in, for example, FIG. 21.

Figure 22:
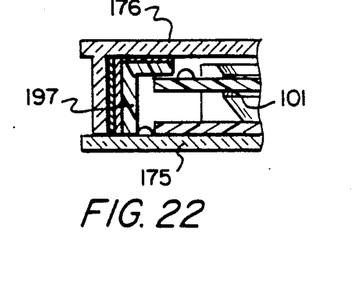
FIG. 22 is an alternate fragmentary view of the front retainer.

FIG. 22 shows an alternate embodiment of the retainer. In FIG. 22 the front retainer 197 is of L-shaped construction and also has the double-sided adhesive tape for securing it at the front edge of the cover. The retainer 197 also is used for holding the identification strip, which is viewable through the clear plastic material forming the storage case and in particular the lid thereof.

Figure 23:
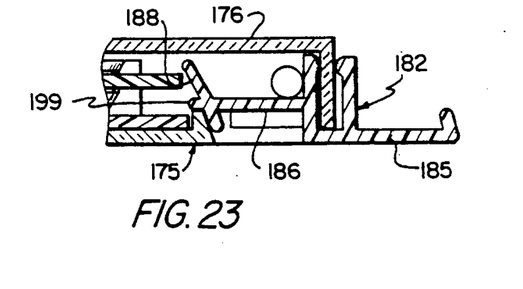
FIG. 23 is an alternate fragmentary view of the rear clip.

FIG. 23 shows an alternate construction for the clip. In this particular embodiment, the clip 182 also includes the legs 185 and 186. There is also provided the extension 188 for engagement with the disc. However, in the embodiment of FIG. 23, there is also provided a support rib 199 that provides for more positive interengagement of the clip with the base 175. This provides a good dust seal so that the case is completely enclosed when in its closed position.

Figure 24:
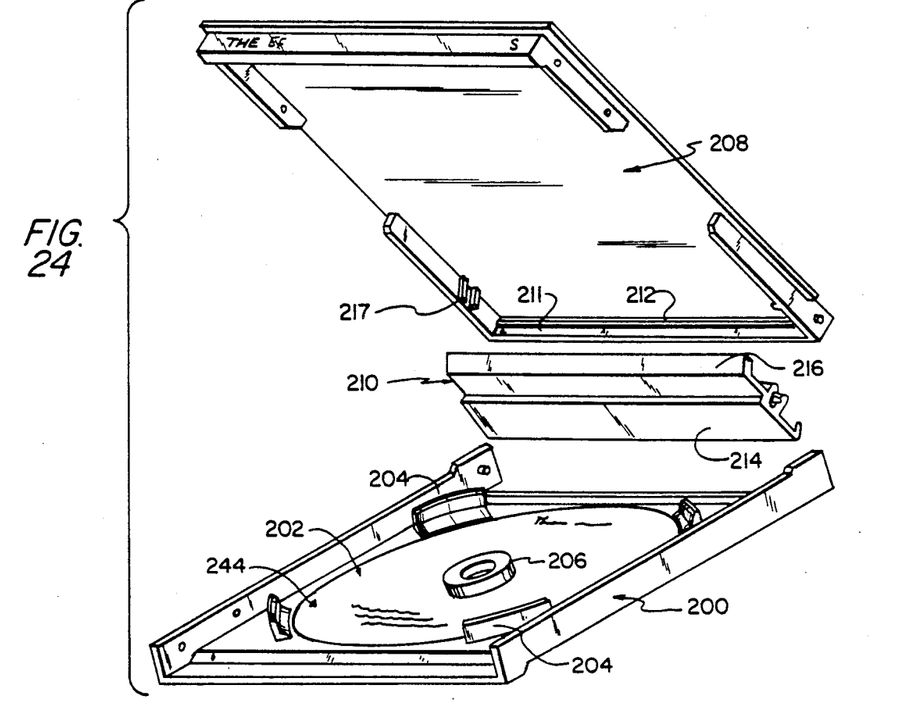
FIG. 24 is an exploded perspective view of still another embodiment of the present invention in which the base of the storage case is of one molded piece.
Figure 25:
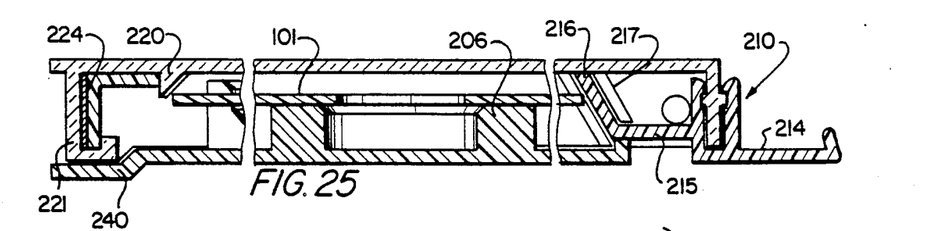
FIG. 25 is a cross sectional view through the storage case of FIG. 24.
Figure 26:
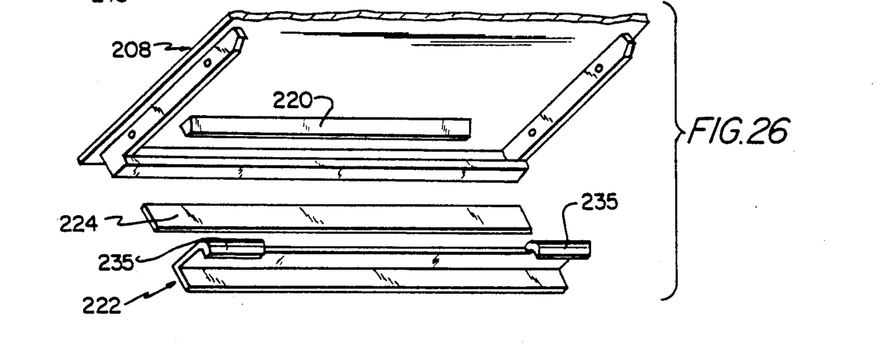
FIG. 26 is a fragmentary exploded perspective view showing the manner in which the front retainer is used with the cover.

Reference is now made to FIGS. 24–26 for a further embodiment of the present invention. In this embodiment, the storage case comprises a base 200 having a molded and integral part 202 constructed therewith. The integral part 202 has the ribs 204 and the center hub 206 is provided with a hole which, like the hole in the insert hub 108 in FIGS. 6–10, provides a guide for a pick-up device, such as pick-up device 122, for disk 101. The storage case also includes a cover 208 and clip 210. The clip 210 is similar to the clip previously described in association with FIG. 21, but is of somewhat different construction.

As illustrated in the cross-sectional view of FIG. 25, the clip 210 has a recess that is adapted to interlock with the rear wall 211 of the cover 208. The rear wall 211 preferably has oppositely disposed ribs 212, which enable in the interlocking. Refer to FIG. 25, which shows the tongue in-groove interlock that is provided, the grooves being provided in the recess of the clip 210. The clip 210 also includes legs 214 and 215 extending in opposite directions. The leg 214 is used to engage with the base in the open position of the case. The leg 215 has its angled end 216 engaging with the edge of the disc, as clearly illustrated in FIG. 25. The end 216 of the leg 215 is also preferably secured in oppositely disposed end recesses defined in the side walls of the cover. In this regard, refer to FIGS. 24 and 25, showing the strips 217 forming a recess therebetween. The very ends of the leg 216 can extend into these recesses for further securing the clip in place on the cover.

As illustrated in FIGS. 25 and 26, the cover 208 preferably also has a securing rib 220 that is integral with the cover and spaced from the front wall 221. A front 222 is provided. The retainer 222 is of L shape construction, and it is adapted to snap into the position illustrated in FIG. 25, holding the identification strip 224 in place. It is furthermore noted that the retaining rib 220 also has the function of engaging with and holding the periphery of the disc at one side thereof. In this regard, refer to FIG. 25.

Figures 27, 28:
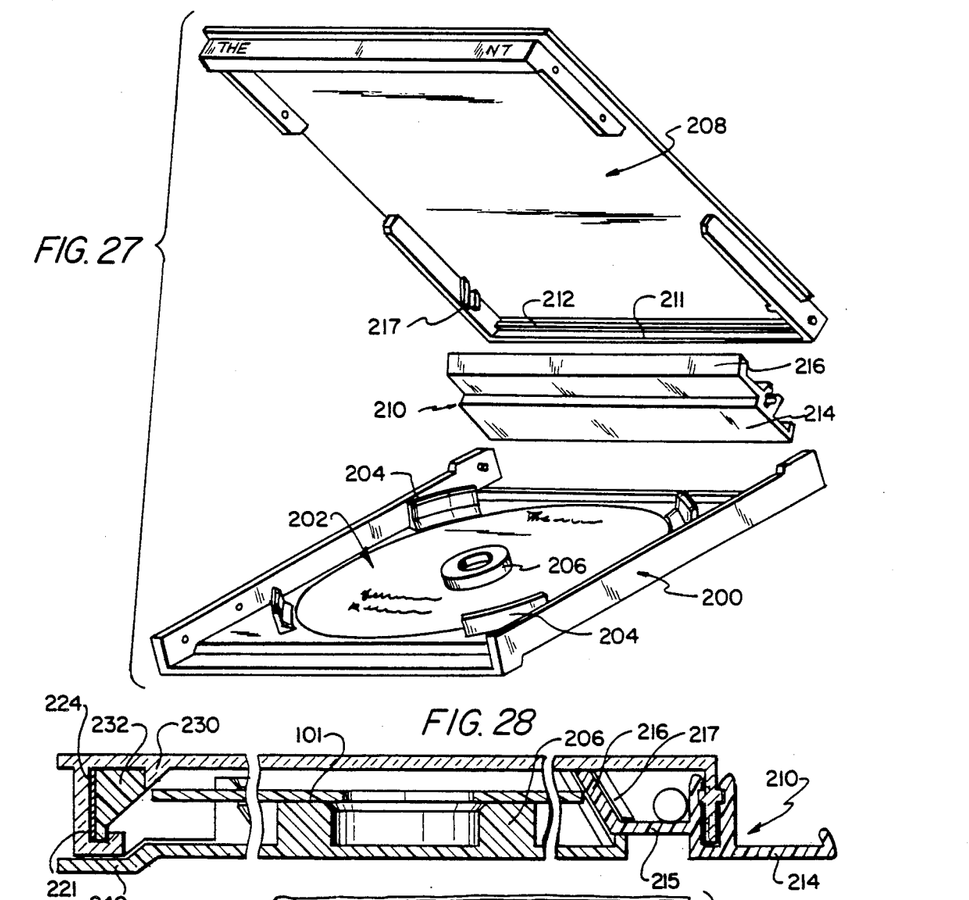
FIG. 27 is an exploded perspective view of a further embodiment of the present invention.
FIG. 28 is a cross-sectional view of the embodiment of FIG. 27.
Figure 29:
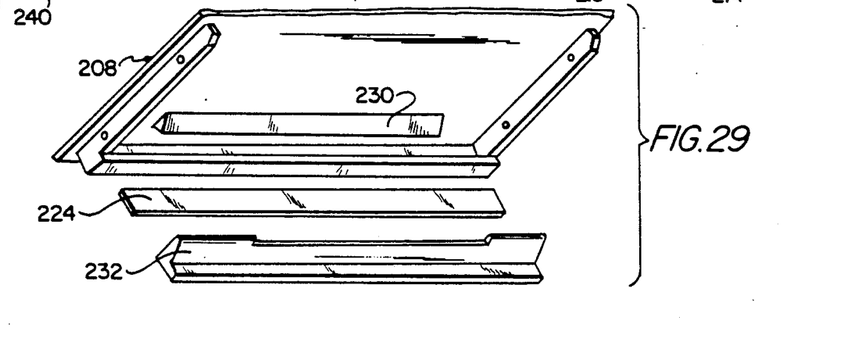
FIG. 29 is a fragmentary exploded view showing the front retainer before engaging with the cover.

A final embodiment of the invention is illustrated in FIGS. 27–29. In this embodiment of the invention, many of the parts previously described and identified in FIGS. 24–26 are the same and thus the same reference characters are applied. Accordingly, in the embodiment of FIG. 27, there is a base 200 having an integral part 202. There is also provided the clip 210 and cover 208. The primary difference between these two embodiments is in connection with the front retainer. In FIGS. 27–29, integral with the cover 208 is a retaining rib 230. Also illustrated is a front retainer 232 that is adapted to snap fit to the position illustrated in FIG. 28, at the same time holding the identification strip 224 in place.

In connection with the retainer 222 illustrated in FIG 26, it is noted that it is provided with end-disposed fingerlifts 235. These are useful in snapping the member back out. In the embodiments illustrated in FIGS. 24–29, it is also noted that the base of the case has a drop front, as illustrated at 240. In these embodiments of the invention, there is furthermore provided indicia hot-stamped, as illustrated at 244 in FIG. 24. This can provide information directly on the base as to the contents of the disc. The cover is preferably transparent so that one can easily read the information hot stamped at 244 to determine the content of the disc, once the disc is removed.

Having now described a limited number of embodiments of the present invention it should now be apparent to those skilled in the art that numerous other embodiments and modifications thereof are contemplated as falling within the scope of the present invention as defined by the appended claims.

What is claimed is:

1. A storage case for a disc-type media comprising a base and cover in combination with a clip on a rear wall of the storage case, the case having an open position and a closed position and being adjustable therebetween, said clip maintaining said cover in a substantially vertical upright position in the open position of the case, said clip further including means for sealing the case in the closed position thereof.

2. A storage case as set forth in claim 1 wherein said clip has oppositely disposed legs, including one leg configured to engage with the storage case base in the open position of the storage case.

3. A storage case as set forth in claim 2 wherein the other leg of the clip forms a retainer configured to engage one side of the media within the storage case.

4. A storage case as set forth in claim 3 wherein said other leg forms the means for sealing the base of the container to provide a sealed case.

5. A storage case as set forth in claim 3 further including means in the case for support of the disc.

6. A storage case as set forth in claim 5 including a front retainer supported in the storage case cover and adapted to engage the other side of the disc.

7. A storage case as set forth in claim 6 wherein said cover has a transparent front wall, and wherein said case includes an indicia sheet retained by said front retainer and viewable through the transparent front wall of the cover.

8. A storage case as set forth in claim 7 wherein said cover includes a retaining rib integral with said cover, and wherein said front retainer snap fits with said retaining rib.

9. A storage case as set forth in claim 5 wherein said means for support of the disc includes means defining a plurality of peripherally disposed ribs and a centrally disposed support hub, said hub having a hole therein to provide a guide for a pick-up device for the disc.

10. A storage case as set forth in claim 9 wherein said disc ribs have at least one tapered surface to guide the disc into place and furthermore have vertical surfaces for limiting side-to-side displacement of the disc.

11. A storage case as set forth in claim 11 wherein said base has a bottom wall with indicia thereon so that said indicia is readable when the disc is removed.

12. A storage case as set forth in claim 11 wherein said base is non-transparent while said cover is transparent.

13. A storage case as set forth in claim 1 further including ribs disposed on the cover and together configured to receive said clip.

14. A storage case for a compact disc, including a base and a cover, wherein said base has a step down front section, said base having an opening in the rear section thereof, and wherein said base is molded as one solid piece, including a central hub, and further including circular retaining ribs, which have a sloped portion on top to guide the disc down to seat on said central hub, and further including a vertical wall to retain the disc from side-to-side movement, and still further including a sloped angle located below the vertical wall which prevents the disc from coming in contact with said base, said central hub having a hole in the center, which serves as a guide for a pick-up device.

15. A storage case for a compact disc as defined in claim 14 wherein said cover includes a front section and a rib molded in the front section located for retaining the disc.

16. A storage case for a compact disc, including a base and a cover, wherein said base has a stepdown front section, said cover having a rear section with a rear wall, said cover also having a front section which includes a transparent front wall, said cover having slots located on side walls in the rear section of the cover, said cover having a rib molded in the front section of the cover for retaining the disc, wherein said case further includes a separate front retaining piece which snap fits in the front section of the cover against said rib, and wherein said separate front retaining piece holds an indicia sheet in place so as to be viewable through the transparent front wall of the cover.

17. A storage case for a compact disc, including a base and cover, wherein said base has a step down front section, said cover having a rear section with a rear wall, said cover also having a front section, said cover having slots, located on side walls in the rear section of the cover, said cover having a rib on both sides of the cover rear wall, said cover having a rib molded in the front section for retaining the disc, and wherein the front section of the cover has a front vertical wall with a horizontal portion at one end of said front vertical wall.

18. A storage case for a compact disc as defined in claim 17, in combination with a back clip which forms a rear wall for said case while maintaining a clipped-on-portion to the rear of said cover.

19. A storage case for a compact disc as defined in claim 18, wherein said back clip has an inward extending part and an outward extending part, said inward extending part forming a retainer for a compact disc, and said outward part forming an extension to engage with said base, while said cover maintains an open position.

20. A storage case for a compact disc as defined in claim 19, wherein said back clip has inner walls having slots for maintaining engagement with said rib of said rear wall of said cover.

21. A storage case for a compact disc as defined in claim 20, wherein said back clip inward extending part forms an engagement with said cover slots located on said side walls in the rear section of said cover, while the center part of the clip maintains engagement with said rear wall of said cover.

22. A storage case for a compact disc, comprising a base and a cover in combination with a hot stamp identification program located on an inner surface of the base with the legend facing in an upward direction, which can only be viewed after the disc has been removed from the case, having no other obstacle between the cover and the hot stamp program located on the base, in further combination with said base being non-transparent and said cover being transparent.

23. A storage case for a compact disc, comprising a base and a cover in combination with an adhesive-backed program identification sheet located on an inner surface of the base, said program identification sheet having a legend side facing in an upward direction which can only be viewed after the disc has been removed from the case, having no other obstacle between the cover and program identification sheet located on the base, in further combination with said base being non-transparent and said cover being transparent.

24. A storage case for a compact disc including a base and a cover, wherein said base is molded as one solid piece, including a central hub, and further including circular retaining ribs, which have a sloped portion on top to guide the disc down to seat on said central hub, and further inclining a vertical wall to retain the disc from side-to-side movement, and still further including a sloped angle located below the vertical wall which prevents the disc from coming in contact with said base, said central hub having a hole in its center, which hole serves as a guide for a pick-up device.

25. A storage case as set forth in claim 24, wherein said base has a step down front section.

26. A storage case as set forth in claim 24, wherein said hole in the center of the hub also serves as a place for a finger, thumb pick-up.

27. A storage case as set forth in claim 24, wherein the two vertical side walls of the base are equal in height to the top of the circular retaining ribs located from left to right directly across from said retaining ribs.

28. A storage case for compact discs as defined in claim 24 wherein said base has an opening in the rear section thereof.

29. A storage case comprising a base and a cover, wherein said base is non-transparent, and said cover is transparent, including a front retainer supported in the storage case cover and adapted to engage the front side of the storage disc, further including a indicia sheet retained by said front retainer and viewable through the transparent front wall of the cover.

30. A storage case as set forth in claim 29 wherein said front retainer snap fits with a retaining rib integral with the cover.

31. A storage case for a compact disc including a base, a cover having a transparent front wall, a front retainer supported in the storage case cover and adapted to engage on the front side of compact disc, an indicia sheet retained by said front retainer and viewable through the transparent front wall of the cover, said front retainer snap-fitting with a retaining rib integral with the cover.

32. A storage case for a compact disc including a base and a cover wherein said base is molded as one solid piece, including a central hub, and further including circular retaining ribs, which have a sloped portion on top to guide the disc down to seat on said central hub, and further including a vertical wall to retain the disc from side-to-side movement, said central hub having a hole in the center, which serves as a guide for a pick-up device.

33. A storage case for compact discs as defined in claim 32, wherein said base has an opening in the rear section thereof.

34. A storage case for a compact disc including a base and a cover, said storage case having an opened position and a closed position, further including means having a centrally disposed support hub, said hub having a hole therein to provide a guide for a pick-up device for the disc, further including a plurality of peripherally disposed ribs, in combination with an angled member located inside of said cover, said angled member being located to keep the disc from coming in contact with the inner surface of the cover while the storage case is in the closed position of the case.

35. A storage case for a compact disc including a base, a cover having a transparent portion, an adhesive-backed program identification sheet, integral with the base and located on the inner surface of the base, said program identification sheet having a legend side facing in an upward direction, which is viewed through the cover transparent position upon removal of the stored unit from the case, having no other obstacle between the cover and the program identification sheet located on the base.

36. A storage case for a compact disc including a base, a cover having a transparent portion, an adhesive-backed program identification sheet, integral with the base and located on the inner surface of the base, said program identification sheet having a legend side facing in an upward direction, which is viewed through the cover transparent portion and provides simultaneous viewing as the disc is being removed from the storage case.

37. A storage case for a compact disc including a base, a cover having a transparent portion, program identification means integral with the base and located on the inner surface of the base, said program identification means having a legend side facing in an upward direction which can only be viewed through the cover transparent portion after removal of the disc from the storage case, having no other obstacle between the cover and the program identification means located on the base.

38. A storage case for a compact disc, including a base and a cover, wherein said base is molded with a central hub, a plurality of arcuately disposed retaining ribs, each said rib having a sloped portion on top to guide the disc down to seat on the central hub, and further including a vertical wall below said slope portion to retain the disc from side-to-side movement, said central hub having a hole therein which serves as a guide for a pick-up device.

39. A storage case as set forth in claim 38 wherein said base has a step down front section.

40. A storage case for a compact disc including a base and a cover, further including means having a centrally disposed support hub, said hub having a hole therein to provide a guide for a pick-up device for the disc, further including a plurality of peripherally disposed ribs, said base having an opening in the rear section thereof.

* * * * *